P. G. OLSON.
LOCOMOTIVE CAB WINDOW STRUCTURE.
APPLICATION FILED APR. 6, 1916.

1,201,862.

Patented Oct. 17, 1916.
2 SHEETS—SHEET 2.

Inventor
Peter G. Olson
By Norman T. Whitaker
Attorney

UNITED STATES PATENT OFFICE.

PETER G. OLSON, OF ST. PAUL, MINNESOTA.

LOCOMOTIVE-CAB-WINDOW STRUCTURE.

1,201,862.      Specification of Letters Patent.     Patented Oct. 17, 1916.

Application filed April 6, 1916. Serial No. 89,429.

*To all whom it may concern:*

Be it known that I, PETER G. OLSON, a citizen of the United States, residing at the city of St. Paul, in the county of Ramsey, State of Minnesota, (whose post-office address is 525 Merchants Bank Building, St. Paul, Minnesota, c/o Comfort & Masek,) have invented certain new and useful Improvements in Locomotive-Cab-Window Structures, of which the following is a specification.

My invention relates to a locomotive cab window structure.

The primary object of my invention is to provide a cab window structure that will prevent frost or snow from adhering to the window.

Another important object of the present invention is to provide a structure that may be easily used upon any locomotive or the like.

A further object is to provide a structure of the above mentioned character which consists of few parts, is inexpensive to manufacture and which may be placed on the market at a comparatively low cost.

The above and other objects of my improved structure will fully appear from the following description, taken in connection with the accompanying drawings and be explicitly defined in the appended claims.

Figure 1:
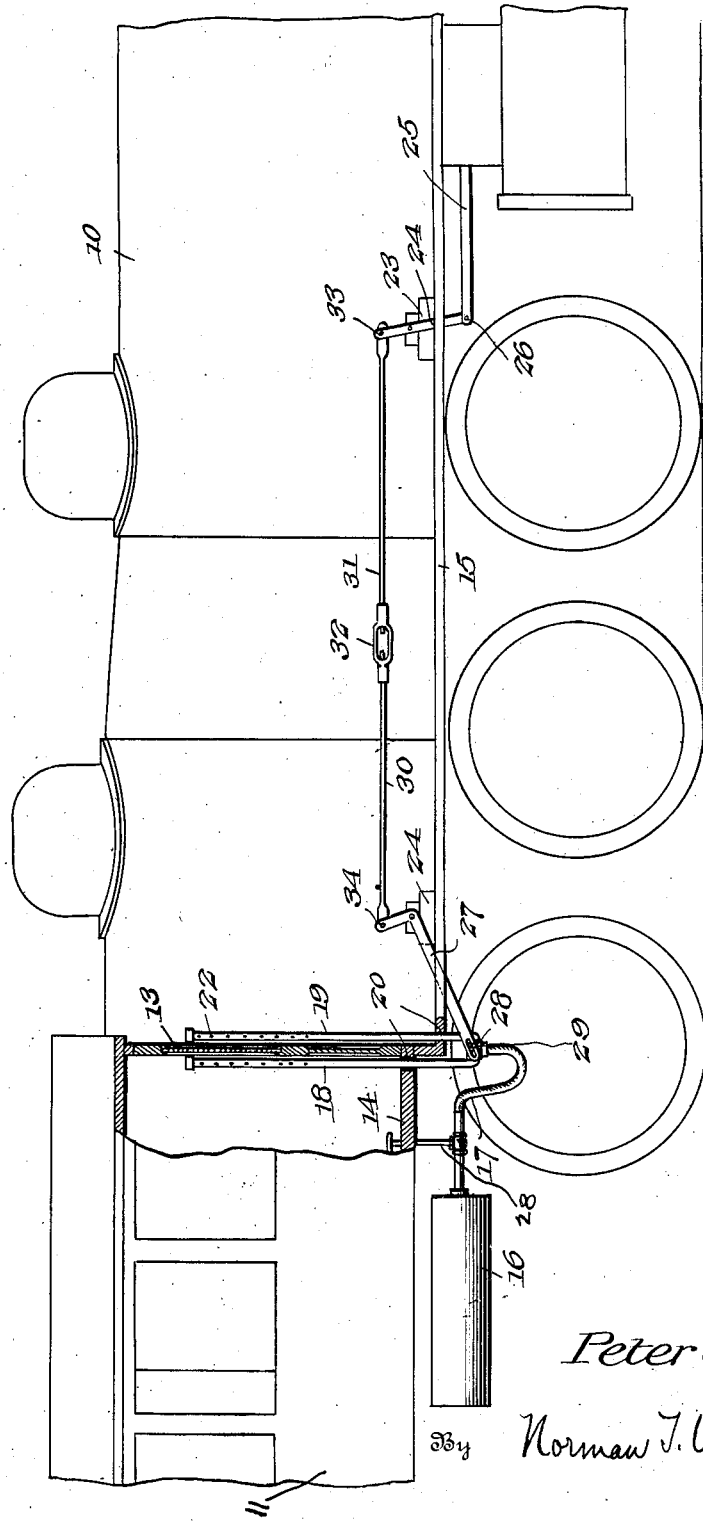
Figure 2:
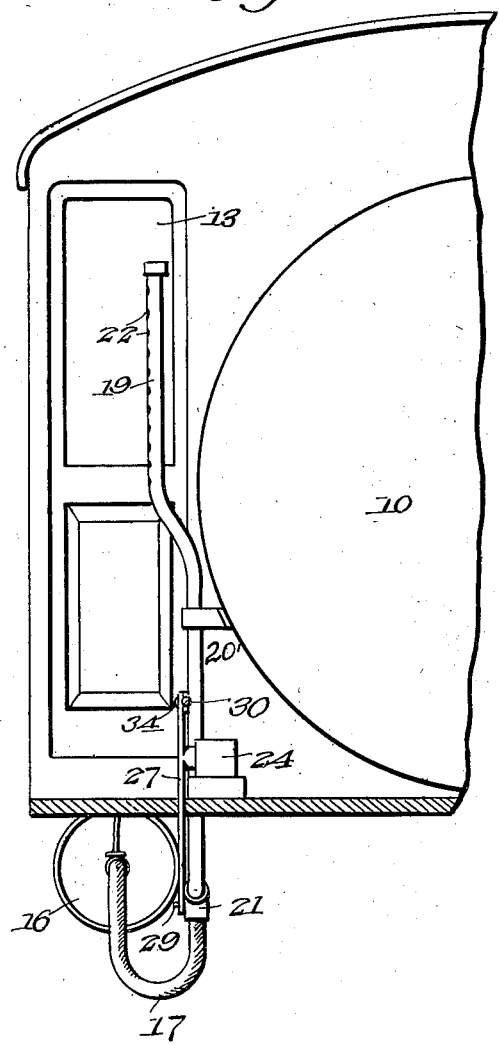
Figure 3:
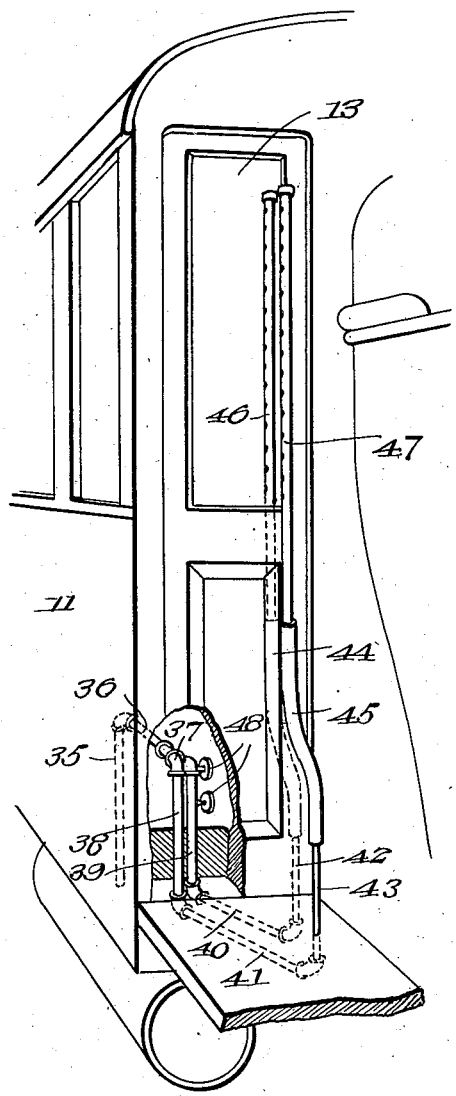

In the drawings, Figure 1 is a diagrammatic view of a locomotive showing my invention applied thereto; Fig. 2 is a front view of the locomotive cab and showing certain parts of the invention applied thereto; and Fig. 3 shows a locomotive cab and a modified form of the invention applied thereto.

Referring to the drawings and more particularly to Fig. 1 thereof, the numeral 10 indicates a locomotive in general.

The numeral 11 indicates the locomotive cab having the front window 13 and the floor 14.

A longitudinal flange or running board 15 is mounted upon the locomotive. Supported beneath the cab 11 in any desirable manner is a compressed air storage tank 16 having a flexible connection 17 communicating therewith. Relatively long pipes 18 and 19 are arranged upon opposite sides of the cab window 13 and in close proximity to the same. These pipes extend vertically and through openings 20 in the cab floor. A guide member 20' which is carried by the locomotive encircles the pipe 19. These pipes are connected at their lower ends by a Y-shaped connection 21 which is connected with the flexible connection 17. These pipes 18 and 19 are provided with alined openings 22.

Mounted upon the flange 15 adjacent to the forward end of the locomotive is a block 23. Pivotally connected with this block 23 is a link 24 which is pivotally connected with the usual valve rod 25 as at 26. A block 24 is also mounted upon the flange 15 adjacent to the cab 11. A bell crank lever 27 is pivotally mounted upon the outer face of this block which is provided with a longitudinal slot 28 in one end thereof.

A pin 29 extends outwardly from the Y-shaped connection 21 and within the slot 28 of the bell crank lever 27. An adjustable rod comprising sections 30 and 31 that are connected together by means of a turnbuckle 32, has one of its ends pivotally connected with the upper end of the link 24, as at 33. The other end of this rod is pivotally connected with the bell crank lever 27, as at 34.

The operation of the apparatus is as follows: The engine being in motion and the air from the air tank being released, the valve rod 25 imparts a rocking motion to the link 24 which in turn reciprocates the adjustable rod thereby rocking the bell crank 27 which in turn imparts a reciprocatory motion to the pipes 18 and 19.

In Fig. 3 a modified form of my invention is shown. This form is the preferred embodiment of the invention. Referring to this figure an air tank 16 is shown supported beneath the cab floor 14. Extending vertically from this tank and through the floor 14 and within the cab 10 is a pipe 35. Connected with this vertical pipe 35 at its upper end is a horizontal pipe 36. A Y-shaped connection 37 is connected with this horizontal pipe. Extending downwardly from the Y-shaped connection are the vertical parallel pipes 38 and 39. Communicating with these pipes 38 and 39 at their lower ends are the horizontal pipes 40 and 41 which extend at right angles to pipes 38 and 39. A vertical pipe 42 connects with this pipe 40 and extends within the cab 10 and along the window 13, while a pipe 43 extends through the running board 15 and connects with the pipe 41. This pipe 43 is arranged outside of the cab and extends upon the outer face of the window 13. Flexible tubes 44 and 45 are connected with the upper ends of the pipes 42 and 43. Relatively long perforated pipes 46 and 47 are mounted in these flexible tubes. Valves 48 control the flow of compressed air. It will be seen that when these valves 48 are open the air will flow through the pipes and escape through the perforations in the pipes 46 and 47, thus blowing the snow off the cab window and away from the immediate vicinity of the same. It will also be seen that the air which strikes the cab window at both sides keeps up an even temperature of the cab window, thereby preventing frost from forming thereon.

While I have described this apparatus as applied to a locomotive, it may be however, applied to an automobile, street car or, in fact, any place where there are windows. I wish it understood, however, that this disclosure is illustrative only, and that the principle of my invention can be embodied in constructions other than the ones specified.

Having described my invention what I believe to be new and desire to secure and protect by Letters Patent of the United States is:

1. The combination with a locomotive, of reciprocatory perforated pipes arranged in close proximity to a window thereof, means operatively connecting the locomotive valve gear and the pipes for reciprocating the same, and a fluid tank having communication with the pipes.

2. The combination with a locomotive, of perforated pipes arranged on opposite sides of a window thereof, means operatively connecting the pipes and the locomotive valve gear for reciprocating the pipes, and a fluid supply having communication with the pipes.

3. The combination with a locomotive, of perforated pipes arranged upon the opposite faces of a window thereof, a fluid tank having communication with the pipes, a link pivotally connected upon the locomotive and having pivotal connection with the valve rod of the locomotive, a bell crank lever also pivotally mounted upon the locomotive having one end thereof operatively connected with the perforated pipes, and a rod having one end pivotally connected with the bell crank lever and its upper end pivotally connected with the link.

PETER G. OLSON.